Aug. 18, 1964  W. F. HORNING ETAL  3,144,858
AIR-COOLED INBOARD ENGINE
Filed Oct. 15, 1962  3 Sheets-Sheet 1
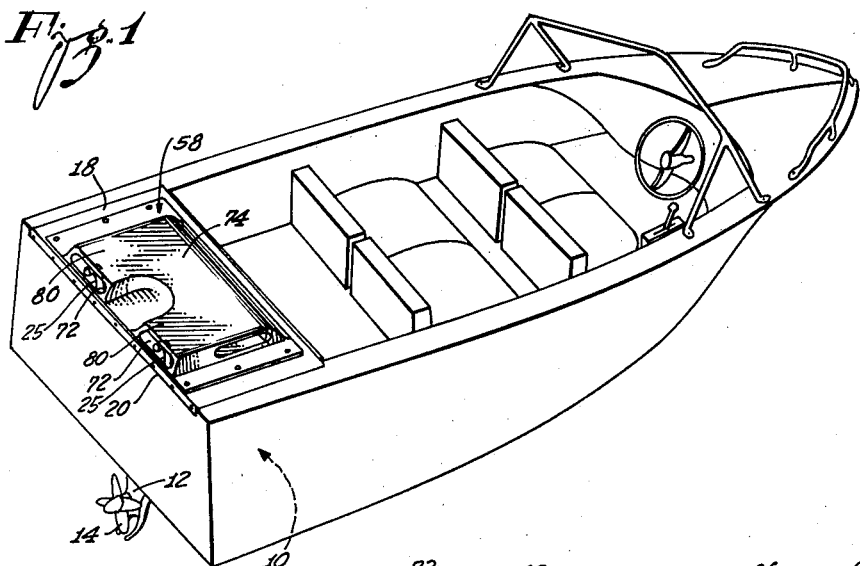
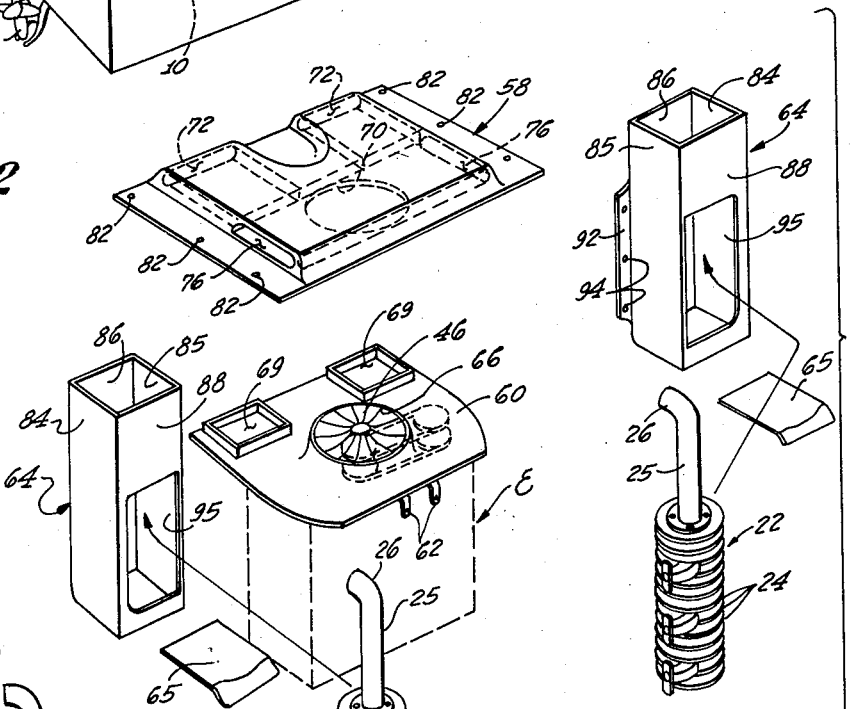
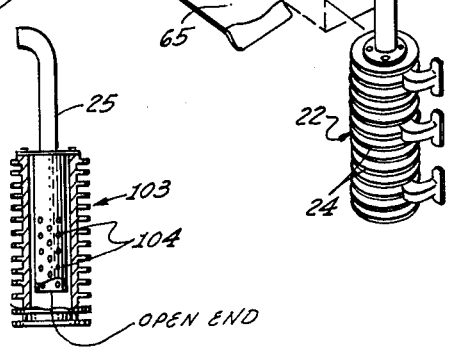
INVENTORS:
Wayne F. Horning
Robert W. Jones
Smyth, Roston & Pavitt
Attorneys

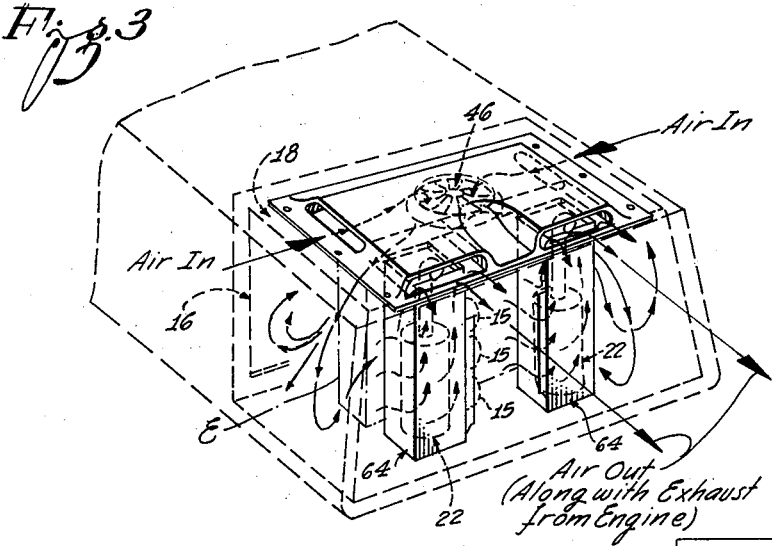
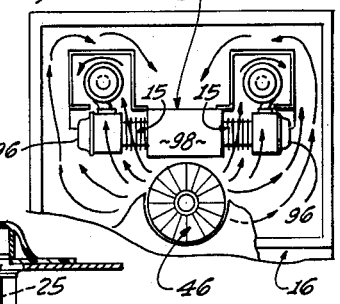
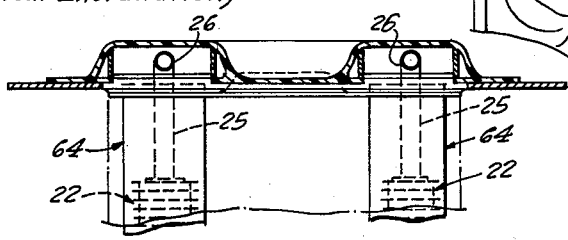
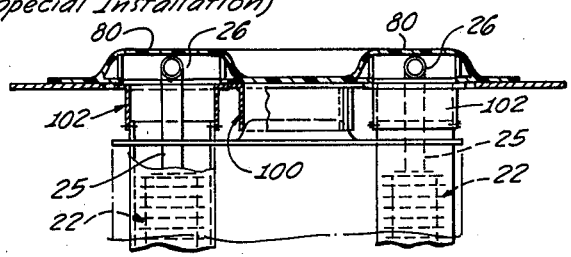
INVENTORS:
Wayne F. Horning
Robert W. Jones

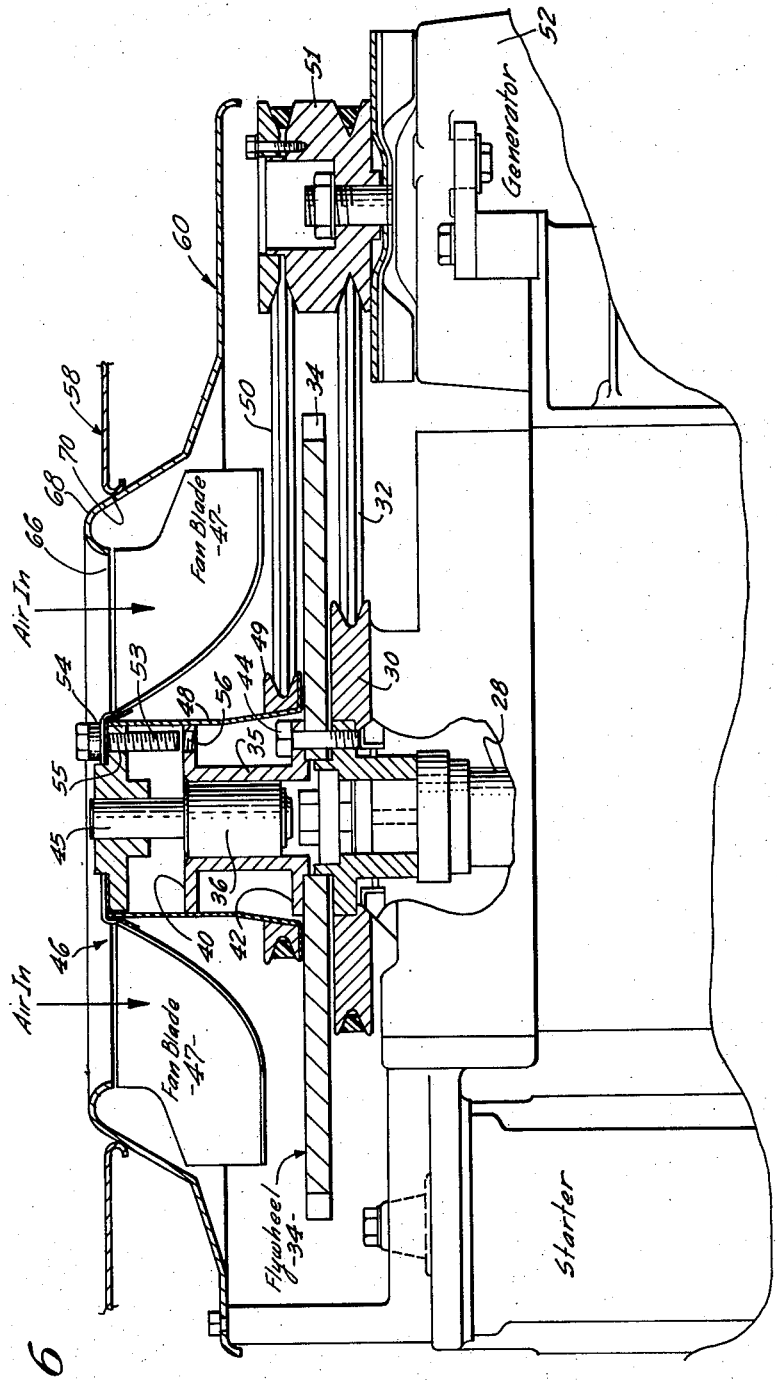

United States Patent Office 3,144,858
Patented Aug. 18, 1964

3,144,858
AIR-COOLED INBOARD ENGINE
Wayne F. Horning, Arcadia, and Robert W. Jones, San Gabriel, Calif., assignors to Inboard Marine, Inc., Temple City, Calif., a corporation of California
Filed Oct. 15, 1962, Ser. No. 230,611
16 Claims. (Cl. 123—41.31)

This invention relates to an air-cooled inboard engine and, more particularly, is directed to an air-cooling system for an air-cooled engine in a motorboat.

The advantages afforded by air-cooled internal combustion engines as distinguished from water-cooled engines are well known and are especially inviting for marine use, but difficult problems arise in any attempt to provide a suitable air-cooling system. Various solutions to the problem have been developed but, because of various shortcomings, none have had widespread commercial acceptance.

In general the prior art cooling systems for marine engines have been of complicated construction with consequent unduly high cost. The complicated constructions do not lend themselves to mass production and, moreover, are not readily adaptable to a wide variety of types and sizes of boats.

Another serious disadvantage is that a cooling system necessarily encloses extensive portions of an engine and a cooling system as heretofore constructed makes the engine difficult of access for servicing and repairs. Still another disadvantage is that an air-cooling system usually interferes with angular adjustment of the engine for different degrees of inclination of the engine shaft. A further disadvantage is that an air-cooling system for an engine must be ported for ample air intake and under some conditions, for example during a storm, water may enter and flood the cooling system.

The present invention solves the basic problem and avoids all of these disadvantages by enclosing an engine of the air-cooled type in a sealed compartment of ample volume having suitable air-intake port means and air-discharge port means. A fan powered by the engine induces air flow through the air-intake port means into the compartment to maintain the compartment above the pressure of the ambient atmosphere so that air in the compartment continually absorbs heat from the engine and is continually forced out through the air-discharge port means. A discharge duct structure located inside the compartment and connected to the air-discharge port means encloses the exhaust piping of the engine and draws the streaming discharge air over the finned cylinders of the engine for highly effective transfer of heat.

The described cooling system is of uncomplicated construction because the cooling system is provided largely by the structure of the boat itself and because a single fan serves all the functions of cooling the engine proper, cooling and insulating the exhaust system, and of supplying fresh air to the engine intake. The discharge duct structure inside the cooling compartment is of simple construction but is of relatively small dimension in comparison with the size of the engine. In addition the cooling system is readily adaptable to various boats since the only requirement is an ample compartment for the engine. The invention further teaches that the provision of an ample engine compartment with a removable top wall and a removable front wall panel makes the enclosed engine fully accessible for servicing and repairs. In addition, an engine enclosed in an ample cooling compartment may be readily tilted to various angles in the compartment as may be required for inclining the engine shaft to the desired degree.

The concept of enclosing the whole engine in a cooling compartment has other new and unexpected advantages. The whole surface of the engine is exposed to cooling air and with rapid replacement of the heated air the temperature of the engine is lowered to reduce the fire hazard as well as to promote better engine performance. For example, in one embodiment of the invention employing a conventional air-cooled automobile engine, the maximum engine temperature at maximum loading is 346° F., whereas the same engine in a conventional installation in an automobile has a normal temperature range of 350–475° F. at 30 to 60 miles per hour and has a peak range of 460–600° F. In addition, the elevation of the pressure of the air in the compartment and the cooling of the engine gases also improve engine performance.

A special advantage of the invention is that it eliminates the likelihood of the cooling system becoming flooded by shipping water. In the preferred practice of the invention, all of the incoming air is directed through the blades of a fan that rotate so fast that it atomizes any quantity of water that may be introduced. The only effect of the intrusion of water is the creation of fine mist in the cooling compartment which is taken up by the discharge duct structure. Any water that remains accumulates in the bottom of the engine compartment for ready removal by the usual bilge pump.

The invention provides for driving the fan faster than the engine shaft for optimum and highly efficient performance of a conventional automobile fan. In the preferred construction, the engine shaft is connected to the engine generator by a belt drive and the generator, in turn, is connected to the fan by a second belt drive, the pulleys involved being sized to speed up both the generator and the fan.

In this regard, a feature of the invention is the simple arrangement for driving the fan at the same speed as the engine in the event that one of the two belt drives fails. The fan is positioned coaxially of the engine shaft and is adapted for direct connection to the engine shaft by means of a spare emergency screw that is carried by the fan.

A further important feature is that the invention may be sold as an engine assembly incorporating the cooling system and that such an engine assembly is highly flexible in the sense that it may be readily adapted to any boat. The engine assembly includes the previously mentioned discharge duct structure and further includes a simple cowling adjacent the engine fan. In addition, the assembly preferably includes a wall member for the top of the engine compartment, this wall member being equipped with both the air-intake port means and the air-discharge port means of the compartment.

In preparation for installing the engine in a boat, the boat is provided with an engine compartment having a top opening that is to be covered by the ported wall member of the engine assembly. When the engine is installed in the compartment at the desired angle of tilt, the ported wall member is adjusted over the top opening of the compartment in position for cooperation of the fan with the air-intake port means and for connection of the discharge duct structure with the air-discharge port means.

If the hull of the boat is relatively low it may be built up as required by adding a hatch to form an engine compartment of the required height. On the other hand, if the hull is of greater vertical dimension than required, the engine assembly includes passage structure to serve as extensions for placing the fan in operative relation to the air-intake port means and for connecting the discharge duct structure with the air-discharge port means.

In some instances local ordinances may require that the engine be muffled. A feature of the invention in this regard is that it includes a finned manifold structure of enlarged diameter inside the discharge duct structure that replaces the conventional exhaust manifold and, if desired,

3 a muffler insert may be mounted in this manifold structure.

The features and advantages of the invention may be understood from the following detailed description together with the accompanying drawings:

In the drawings, which are to be regarded as merely illustrative:

FIG. 1 is a perspective view of a motorboat incorporating a preferred embodiment of the invention;

FIG. 2 is an exploded perspective view of a typical engine assembly that may be sold separately for installation in a boat;

FIG. 3 is a diagrammatic perspective view showing the boat in phantom and showing the general pattern of air flow through the cooling system;

FIG. 3a is a diagrammatic plan view further revealing the pattern of air flow through the cooling system;

FIG. 4 is a fragmentary sectional view showing how the fan cowling of the engine and the discharge duct structure are related to the ports at the top of the engine compartment;

FIG. 5 is a similar view showing how in the installation of an engine in a relatively high compartment, auxiliary passage structures may be included in the engine assembly for connecting the fan cowling and the discharge duct structure with the ports in the top of the compartment;

FIG. 6 is an enlarged fragmentary view, partly in side elevation and partly in section, showing how the fan is operatively connected to the engine shaft by means that drives the fan faster than the engine shaft; and FIG. 7 is a sectional view showing how a muffler insert may be mounted in an exhaust manifold.

In the drawings, which illustrate the selected embodiment of the invention, FIG. 1 shows a boat driven by a suitable air-cooled engine that is enclosed by a sealed cooling compartment, generally designated 10, at the hull of the boat. The inboard motor has a downwardly extending housing extension 12 which carries a propeller 14, the housing extension being rotatable to swing the propeller through a range of angles for steering the boat. It will be readily apparent to those skilled in the art that the heretofore stated inventive concept may be applied to various air-cooled engines and that the cooling system which includes the cooling compartment 10 may be embodied in a wide range of structural arrangements within the scope of the appended claims.

For the purpose of the present disclosure the cooling system is specifically adapted to a Corvair engine which is generally designated E in FIGS. 2, 3 and 3a. This engine has two rows of cylinders 15 that are finned in a well known manner to facilitate air-cooling. For use in a boat, the engine is turned with its drive shaft upright, the finned cylinders being in two substantially vertical rows. The cooling compartment 10 in which the engine E is installed is adapted for ready access to the engine and for this purpose has a removable front wall or panel 16 and a top wall or cover 18, which may be connected to the boat structure by a piano hinge 20 along its rear edge. Both the front panel 16 and the cover 18 are normally sealed tight.

As heretofore stated, what may be termed an engine assembly comprising the engine and the associated components of the cooling system may be sold as a unit for installation by the purchaser. In this particular embodiment of the invention the engine assembly comprises the parts shown in FIG. 2.

As normally produced by the manufacturer for installation in an automobile, the engine E has a plain exhaust manifold of a well known construction. A feature of the present invention is the concept of substituting a pair of diametrically enlarged manifolds, designated 22 in FIG. 2, which manifolds are formed with numerous fins 24 for air-cooling. Each of the manifolds is equipped with an upwardly extending tail pipe 25 with a rearwardly curved upper end 26.

The engine E as manufactured for automotive use also

4 has a conventional fan driven by the engine shaft. In the present embodiment of the invention, however, the fan arrangement is modified as shown in FIG. 6.

In FIG. 6 a unitary assembly fixedly mounted on the upper end of the engine shaft 28 comprises a lower pulley 30 in engagement with a lower V-belt 32, the usual fly wheel 34 and a cylindrical cage 35 carrying and enclosing a suitable anti-friction bearing 36. The cylindrical cage 35 has an upper radial flange 40 and a lower radial flange 42 and the assembly is unified by a plurality of screws 44 that extend downward through the lower radial flange.

The bearing 36 in the cage 35 journals a short shaft 45 of a conventional automotive fan, generally designated 46, having the usual blades 47. The fan structure includes a sheet metal hub 48 that overhangs and encloses the bearing cage 35. Fixedly mounted on the lower end of the hub 48 is a pulley 49 that engages an upper V-belt 50. The two V-belts 32 and 50 both engage a double pulley 51 on the generator 52 of the engine. Thus the lower belt 32 is actuated by the engine shaft to drive the generator 52 and the generator in turn drives the fan 46 by means of the upper V-belt 50.

It is contemplated that the fan 46 which is supplied with the Corvair motor will be stepped up to an optimum speed for efficient propulsion of cooling air. For this purpose the lower pulley 30 is larger in diameter than the other pulleys to provide the desired increase in speed.

A feature of this embodiment of the invention is the provision of an emergency bolt 53 which may be used for directly connecting the fan 46 with the engine shaft 28 in the event that one of the two V-belts 32 and 50 should fail when the boat is away from port. The emergency bolt 53 normally carries a relatively thick spacer collar 54 and is mounted in a tapped bore 55 in the hub structure of the fan. When such an emergency occurs, it is a simple matter to withdraw the emergency bolt 53 from the tapped bore 55 for the purpose of removing the spacer collar 54. The emergency bolt is then again threaded into the tapped bore 55 and is further threaded into an aligned tapped bore 56 in the upper radial flange 40 of the bearing cage 35 for fixedly attaching the fan to the bearing cage for rotation with the bearing cage. With the fan directly driven by the engine shaft, the fan operates at less than its optimum speed but nevertheless has sufficient efficiency for the boat to return to port at somewhat reduced cruising speed. If only the upper V-belt 50 fails, the generator 52 is driven by the lower belt. If the lower belt 32 fails, the generator will be driven by the upper belt 50.

With the conventional engine equipped with the described fan arrangement and with the two finned manifolds 22 substituted for the conventional manifolds, the engine assembly shown in FIG. 2 further includes the following components: a special cover plate 58 to be incorporated into the structure of the previously mentioned hinged cover 18; a special cowling 60 that is fixedly mounted on the upper end of the upright engine by means including a pair of brackets 62, the cowling having an opening 66 with a raised rim 68 surrounding and overhanging the fan 46 and also having a pair of rectangular openings 69; and a discharge duct structure comprising a pair of upright duct members 64 and a corresponding pair of separate bottom plates 65, the duct members extending through the rectangular cowling openings 69 and being suitably adapted for fixed attachment to the engine in positions to enclose the two finned manifolds 22 respectively.

The special cover plate 58 of the engine assembly has a central forward circular air-intake port 70 for registration with the opening 66 of the cowling 60 in the manner shown in FIG. 6. In addition, the special cover plate 58 has a spaced pair of rearward rectangular air-discharge ports 72 for cooperation with the two duct members 64 respectively. The special cover plate 58 further includes integral wall structure which arches over the circular air-intake port 70 and forms two laterally extending air-intake passages having laterally positioned entrances 76 for air flow from the atmosphere into the cooling compartment 10 through the circular air-intake port 70. Additional wall structure arches over each of the two air-discharge ports 72 to form two rearwardly directed discharge hoods 80.

When the engine E is installed in the cooling compartment 10 the raised rim 68 of the opening 66 of the cowling makes sealing contact with the rim around the air-intake port 70 of the special cover plate 58 as shown in FIG. 6 and the upper ends of the two duct members 64 extend into the two rectangular air-discharge ports 72 of the special cover plate with the curved upper ends 26 of the two tail pipes 25 directed rearward through the discharge hoods 80 as indicated in FIGS. 1 and 3. Since the engine is adjusted in inclination in the cooling compartment 10 in accord with whatever degree of inclination is desired for the propeller 14, the special cover plate 58 should be correspondingly adjustable to conform with any desired adjusted position of the engine.

With such adjustment in mind, the special cover plate 58 is provided with holes 82 along its margins to receive suitable bolts. The purchaser of the engine assembly provides the previously mentioned hinged cover 18 for the cooling compartment with a large rectangular opening (not shown) in the hinged cover and with suitable slots adjacent the opening to receive the screws whereby the special cover plate 58 may be adjusted as permitted by the slots, the slots being concealed by the special cover plate.

Each of the two duct members 64 is a metal box-like structure having what may be termed an outer side wall 84, an inner side wall 85, a back wall 86 and a forward wall 88. Each of the duct members 64 is open at the top but the bottom is closed by a previously mentioned bottom plate 65 when the parts are fully assembled. Each of the duct members is suitably adapted for attachment to the engine and for this purpose has a lateral flange 92 provided with bolt holes 94. Each of the duct members is open on its forward side, the forward wall 88 having a vertically elongated opening 95.

When the two duct members 64 are installed on the engine with their lower ends closed by the corresponding bottom plates 65, the two vertically elongated openings 95 offer the only avenues of escape for the air that is inducted into the cooling compartment 10 by the fan 46. With each of the duct members 64 installed, the adjacent cylinder head cover 96 of the engine and the centrally located engine block 98 form an entrance passage for air entering the opening 95 of the duct member, as may be seen in FIG. 3a. Thus in effect, the cylinder head cover 96 serves as a forward extension of the outer side wall 84 of the duct member 64 and the engine block 98 serves as a forward extension of the inner side wall 85, as may be seen in FIG. 3a. In this manner surfaces provided by the engine itself serve as part of the discharge duct structure to cause the discharging air to flow across the finned cylinders 15.

As heretofore stated, if the hull of a boat in which the engine is to be installed is relatively low, it is a simple matter to increase the height of the hull by adding a hatch to form a cooling compartment of adequate height for the engine. On the other hand, if the hull of a boat is of greater vertical dimension than required, the hull may be enclosed to form a relatively high cooling compartment and the accessory shown in FIG. 5 may be added to the engine assembly.

One of these accessories is a central sheet metal cylinder 100 which is adapted to be bolted to the cowling 60 at the rim of the circular opening 66 of the cowling to bridge the gap between the cowling and the elevated air-intake port 70 in the special cover plate 58 at the top of the cooling compartment. The other accessories comprise a pair of passage members 102 adapted to be bolted to the upper ends of the two duct members 64 to bridge the vertical gap between the upper ends of the duct members and the two corresponding air-discharge ports 72 in the elevated special cover plate 58.

The manner in which the invention serves its purpose may be clearly understood from the foregoing description. It is apparent that the engine and the cooling system may either be installed in the factory fabrication of the boat or the described engine assembly may be sold as a unit for installation of the engine and the cooling system by the purchaser. The assembly may be sold to the purchaser with all of the parts of the assembly separated as shown in FIG. 2, but preferably all of the parts except the special cover plate 58 are mounted on the engine when the assembly is sold to the purchaser.

The purchaser fabricates the cooling compartment 10 with a removable front panel 16 and with a hinged top cover 18 formed with a large rectangular opening to be covered by the special cover plate 58 of the engine assembly. When the engine is installed in the cooling compartment and is tilted to the angle desired for the propeller 14 the special cover plate 58 is adjusted for the air-intake port 70 of the special cover plate to register with the opening 66 of the cowling 60 and for registration of the two air-discharge ports 72 of the special cover plate with the upper ends of the two duct members 64.

When the engine is in operation the fan 46 inducts air into the sealed cooling compartment 10 at a rate to elevate the pressure in the compartment above atmospheric pressure. In a typical installation with the boat operating at cruising speed the air pressure in the cooling compartment may be on the order of six inches of water. As may be seen in FIG. 6 the cowling 60 is spaced above the engine to provide a radial space for the incoming air to flow in all radial directions from the fan 46 across the top surfaces of the engine into the space in the compartment that surrounds the engine.

The general character of the flow of the incoming air is indicated by the arrows in FIG. 3, it being apparent that the air initially reaches all sides of the engine. Since the inducted air can escape only through the openings 95 of the two duct members 64, the outgoing air has a flow pattern of the general character indicated by the arrows in FIG. 3a. It is apparent that the outgoing air is concentrated at relatively high velocity across the finned cylinders 15 of the engine. The air then flows freely around the two manifolds 22 inside the duct members 64 for cooling of the exhaust gas.

The exhaust gases from the two manifolds 22 are discharged through the two discharge hoods 80 by means of the tail pipes 25 and their curved upper ends 26. The cooling air from the engine compartment envelopes the two manifolds 22 and the tail pipes 25 and keeps the temperature of the upper walls of the discharge hoods 80 relatively cool to avoid burning anyone's hand. The discharge hoods 80 direct the engine exhaust noise rearward and it is to be further noted that any noise that issues from the sealed compartment through the intake passages of the special cover plate 58 having the entrances 76 are directed laterally away from the boat instead of forward towards the interior of the boat.

If any water enters the lateral air-intake passages 76 it is atomized by the fan 46 and enters the cooling compartment 10 in the form of a fine mist. Some of the mist is vaporized and much of the mist is expelled. If any water does remain, it accumulates in the bottom of the cooling compartment to be drained away by the usual bilge pump.

If local ordinances require mufflers, it is a simple matter to install removable muffler inserts in the two finned manifolds 22, respectively, in the two duct members 64 respectively. FIG. 7 shows such a muffler insert, generally designated 103, installed in a finned manifold 22. The muffler insert 103, which is open at the bottom, has perforations 104 and is connected to the corresponding tail pipe 25.

Our description in specific detail of the selected embodiment of the invention will suggest various changes, substitutions and other departures from our disclosure within the spirit and scope of the appended claims.

We claim:

1. An air-cooled engine installation in a boat, comprising:
   an engine of the air-cooled type having at least one row of finned cylinders with an exhaust pipe extending adjacent to the row;
   a closed compartment in the boat enclosing the engine, said compartment having air-intake port means and air-discharge port means;
   means powered by the motor to induce air into the compartment through the intake port means to maintain the interior of the compartment above the pressure of the ambient atmosphere; and
   a discharge duct structure inside the compartment connected to said discharge port means to discharge the inducted air from the compartment, said discharge duct structure enclosing said exhaust pipe on three sides and being open on the fourth side to receive air from the interior of the compartment, said fourth open side being adjacent said row of finned cylinders to draw the discharging air over the finned cylinders.

2. A combination as set forth in claim 1 in which said exhaust pipe extends through said duct structure to the atmosphere.

3. A combination as set forth in claim 1 in which said duct structure is attached to the engine.

4. An air-cooled engine installation in a boat, comprising:
   a closed compartment in the boat having a wall portion equipped with air-intake port means and air-discharge port means;
   an engine in the compartment with finned cylinders and with exhaust piping extending to said discharge port means for communication with the atmosphere;
   means powered by the engine to induce air into the compartment through the intake port means to maintain the interior of the compartment above the pressure of the ambient atmosphere; and
   discharge duct means inside the compartment at least partially enclosing said exhaust piping and connected to said discharge port means to discharge the inducted air from the compartment, said discharge duct means being open inside the compartment towards the finned cylinders of the engine to draw the discharging air over the finned cylinders, said wall portion of the compartment being adjustable for shift in the location of said two port means whereby the engine may be shifted in the compartment and the two port means may be shifted accordingly to maintain a predetermined relationship to the engine.

5. A combination as set forth in claim 4 in which said engine is tiltable in said compartment and said discharge duct means is attached to the engine to tilt therewith.

6. An engine assembly for mounting in a closed compartment of a boat, wherein the closed compartment has air-intake port means and air-discharge port means, said assembly comprising:
   an engine of the air-cooled type with finned cylinders;
   means including a fan mounted on the engine and driven thereby to induce air into the compartment through said air-intake port means to maintain the interior of the compartment above the pressure of the ambient atmosphere; and
   discharge duct means mounted on the engine for connection with said air-discharge port means to discharge the inducted air from the compartment and to draw the discharging air over the finned cylinders.

7. A combination as set forth in claim 6 which includes a cowling mounted on the engine around said fan for connection with said air-intake port means.

8. A combination as set forth in claim 6 in which said engine has exhaust piping to extend to said air-discharge port means and said discharge duct means encloses at least a portion of said piping on at least three sides thereof.

9. An engine assembly for mounting in a closed compartment of a boat, wherein the closed compartment has air-intake port means and air-discharge port means, said assembly comprising:
   an engine of the air-cooled type with finned cylinders and equipped with exhaust piping for communication with said air-discharge port means;
   a cowling mounted on the engine and forming an opening for connection with said air-intake port means;
   a fan on the engine at said opening of the cowling and driven by the engine to induce air into the compartment through the intake port means to maintain the interior of the compartment above the pressure of the ambient atmosphere; and
   discharge duct means enclosing said exhaust piping and mounted on the engine for connection with said air-discharge port means to discharge the inducted air from the compartment, said discharge duct means drawing the discharging air over the finned cylinders.

10. A combination as set forth in claim 9 which includes passage members to extend from said opening in the cowling to said air-discharge port means and to extend the discharge duct means to said air-intake port means.

11. An engine assembly for mounting in a closed compartment of a boat, wherein the closed compartment has air-intake port means and air-discharge port means, said assembly comprising:
   an engine of the air-cooled type having finned cylinders and a drive shaft;
   means including a fan mounted on the engine to induce air into the compartment through said air-intake port means to maintain the interior of the compartment above the pressure of the ambient atmosphere;
   speed-increasing means including belt means operatively connecting said drive shaft with the fan to drive the fan faster than the drive shaft;
   emergency means to connect the drive shaft directly to the fan to actuate the fan at the same speed as the drive shaft in the event of failure of said belt means; and
   discharge duct means mounted on the engine for connection with said air-discharge port means to discharge the inducted air from the compartment and to draw the discharging air over the finned cylinders.

12. An engine assembly for mounting in a closed compartment of a boat, wherein the closed compartment has air-intake port means and air-discharge port means, said assembly comprising:
   an engine of the air-cooled type with finned cylinders, said engine having a drive shaft and a generator spaced laterally thereof;
   a fan mounted on the engine for rotation independent of the drive shaft to induce air into the compartment through the intake port means to maintain the interior of the compartment above the pressure of the ambient atmosphere;
   a first pulley means on said shaft for rotation therewith;
   a second pulley means on said generator for actuation thereof;
   a third pulley means on said fan for actuation thereof;
   belt means connecting said first pulley means with said second pulley means to actuate the generator;
   belt means connecting said second pulley means with said third pulley means to drive the fan;
   said three pulley means being of different diameters to cause the fan to rotate faster than the drive shaft; and
   discharge duct means mounted on the engine for connection with said air-discharge port means to discharge the inducted air from the compartment and to draw the discharging air over the finned cylinders.

13. A combination as set forth in claim 12 in which said fan is positioned coaxially of the drive shaft; and which includes emergency means to connect the drive shaft directly to the fan to actuate the fan at the same speed as the drive shaft in the event of failure of said belt means.

14. An air-cooled engine installation in a boat, comprising:
   an engine of the air-cooled type with finned cylinders;
   a closed compartment in the boat enclosing the engine, said compartment having air-intake port means and air-discharge port means;
   means powered by the motor to induce air into the compartment through the intake port means to maintain the interior of the compartment above the pressure of the ambient atmosphere;
   a discharge duct structure inside the compartment connected to said discharge port means to discharge the inducted air from the compartment and to draw the discharging air over the finned cylinders of the engine;
   at least one exhaust manifold for the engine, said manifold being in said discharge duct structure to be cooled by air flow therethrough; and
   a muffler in said exhaust manifold.

15. A combination as set forth in claim 14 in which said muffler is a removable insert in said manifold.

16. An air-cooled engine installation in a boat, comprising:
   an engine of the air-cooled type with finned cylinders;
   a closed compartment in the boat enclosing the engine, said compartment having air-intake port means and air-discharge port means;
   means powered by the motor to induce air into the compartment through the intake port means to maintain the interior of the compartment above the pressure of the ambient atmosphere;
   a discharge duct structure inside the compartment connected to said discharge port means to discharge the inducted air from the compartment and to draw the discharging air over the finned cylinders of the engine;
   exhaust means for the engine; and
   muffler means for the engine, both the exhaust means and the muffler means being enclosed in said discharge duct structure.

References Cited in the file of this patent

UNITED STATES PATENTS 2,827,026     Mall et al. _____ Mar. 18, 1958